United States Patent
Yang et al.

(10) Patent No.: US 12,405,413 B2
(45) Date of Patent: Sep. 2, 2025

(54) OPTICAL INTERFERENCE FILTER

(71) Applicant: VIAVI Solutions Inc., Chandler, AZ (US)

(72) Inventors: Jinhui Yang, Santa Rosa, CA (US); Marius Grigonis, Santa Rosa, CA (US); Andrew Clark, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 359 days.

(21) Appl. No.: 17/821,606

(22) Filed: Aug. 23, 2022

(65) Prior Publication Data

US 2024/0069262 A1 Feb. 29, 2024

(51) Int. Cl.
*G02B 5/28* (2006.01)
*G02B 5/20* (2006.01)

(52) U.S. Cl.
CPC ......... *G02B 5/286* (2013.01); *G02B 5/207* (2013.01); *G02B 5/288* (2013.01)

(58) Field of Classification Search
CPC ........ G02B 5/288; G02B 5/285; G02B 1/115; G02B 5/20; G02B 1/007; C23C 28/42
See application file for complete search history.

(56) References Cited

U.S. PATENT DOCUMENTS

| | | | |
|---|---|---|---|
| 2009/0109537 A1* | 4/2009 | Bright | G02B 5/287 359/588 |
| 2013/0040119 A1* | 2/2013 | Chen | C23C 28/042 204/192.15 |
| 2013/0120842 A1* | 5/2013 | Moens | C03C 17/36 359/585 |
| 2014/0154769 A1* | 6/2014 | del Ninno | A01G 7/045 359/359 |
| 2014/0334004 A1* | 11/2014 | Ventola | G02B 5/1814 359/566 |
| 2020/0209448 A1* | 7/2020 | Rowlands | C23C 28/42 |
| 2021/0302635 A1 | 9/2021 | Ockenfuss | |
| 2022/0013561 A1 | 1/2022 | Abadie et al. | |

FOREIGN PATENT DOCUMENTS

WO 2020139841 A2 7/2020

OTHER PUBLICATIONS

Extended European Search Report for Application No. EP231923137 mailed on Jan. 23, 2024, 07 pages.

* cited by examiner

*Primary Examiner* — Jonathan Y Jung
(74) *Attorney, Agent, or Firm* — Harrity & Harrity, LLP

(57) ABSTRACT

An optical interference filter includes one or more sets of layers. Each set of layers includes a first layer that includes at least aluminum and nitrogen (e.g., an aluminum nitride (AlN) material), a second layer that includes at least silicon and oxygen (e.g., a silicon dioxide ($SiO_2$) material), and a third layer that includes at least hydrogen and silicon (e.g., a hydrogenated silicon (Si:H) material). The second layer is disposed between the first layer and the third layer.

20 Claims, 7 Drawing Sheets

OPTICAL INTERFERENCE FILTER

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths. The array of sensor elements may be associated with an optical filter. The optical filter may include a passband associated with a first wavelength range of light that is passed to the array of sensor elements. The optical filter may be associated with blocking a second wavelength range of light from being passed to the array of sensor elements.

SUMMARY

In some implementations, an optical interference filter includes a substrate; and a plurality of sets of layers that are disposed on the substrate, wherein each set of layers includes: a first layer that comprises at least aluminum and nitrogen; a second layer that comprises at least silicon and oxygen; and a third layer that comprises at least hydrogen and silicon, wherein the second layer is disposed between the first layer and the third layer.

In some implementations, an optical interference filter includes one or more sets of layers, wherein each set of layers includes: a first layer that comprises at least aluminum and nitrogen; a second layer that comprises at least silicon and oxygen; and a third layer that comprises at least hydrogen and silicon, wherein the second layer is disposed between the first layer and the third layer.

In some implementations, a wafer includes a plurality of optical interference filters, wherein each optical interference filter includes: a substrate; and a plurality of sets of layers that are disposed on the substrate, wherein each set of layers includes: a first layer that comprises at least aluminum and nitrogen; a second layer that comprises at least silicon and oxygen; and a third layer that comprises at least hydrogen and silicon, wherein the second layer is disposed between the first layer and the third layer.

DETAILED DESCRIPTION

Figure 1:
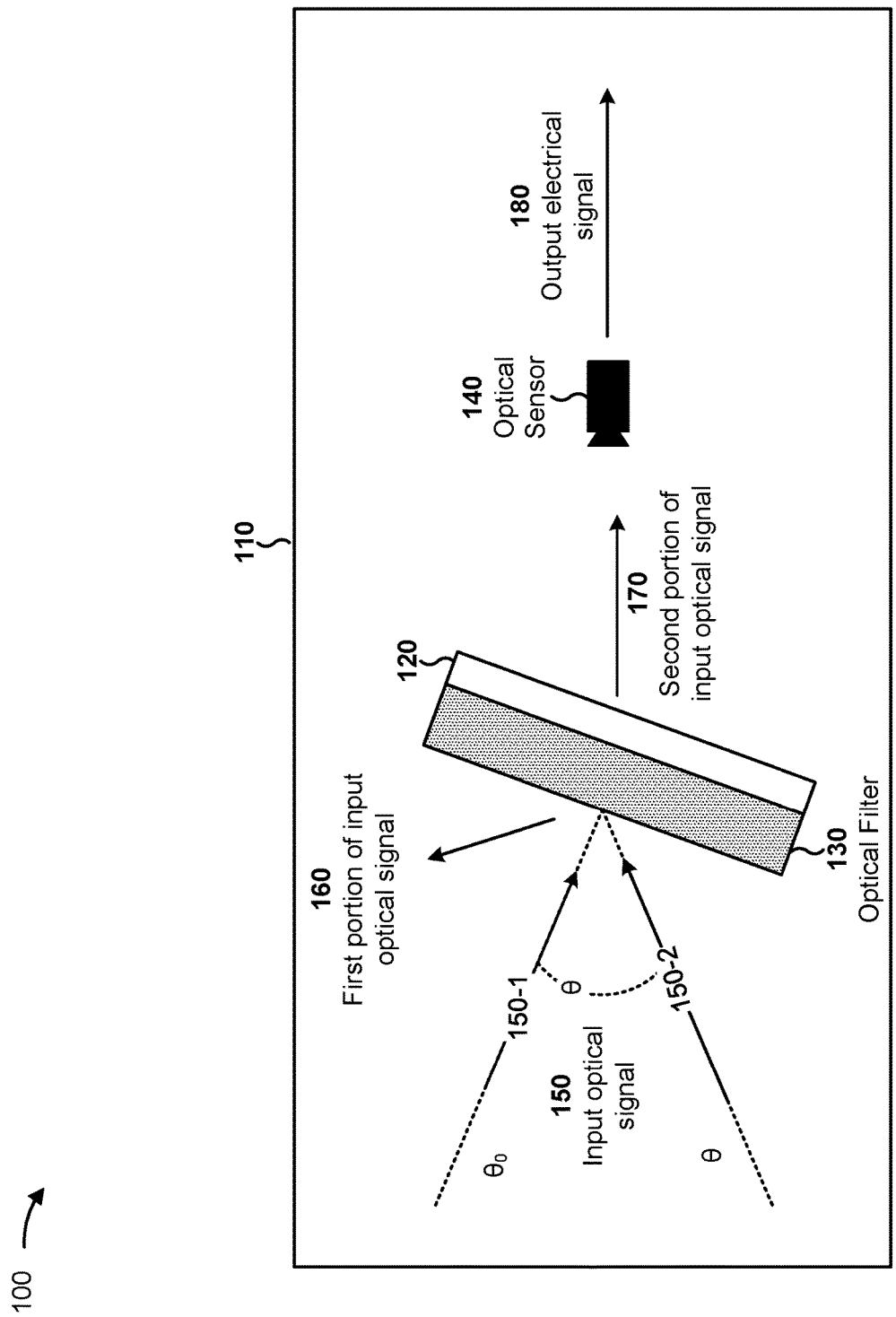
FIG. 1 is a diagram of an overview of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

An optical filter may be manufactured by forming one or more layers on a substrate. For example, an optical filter may include alternating layers of an aluminum nitride (AlN) material and another material (e.g., that does not include AlN) to allow the optical filter to pass a threshold percentage of light (e.g., at least 65% of light) associated with a particular spectral range (e.g., a spectral range of between 800 to 1600 nanometers (nm)). However, in some cases, an interface between a first layer comprising the AlN material and a second layer comprising the other material has low durability. For example, a plurality of optical filters may be singulated on a wafer using a singulation process, and, as a result of the singulation process, the interface between the first layer and the second layer in a portion of the plurality of optical filters fails. This causes each optical filter of the portion of the plurality of optical filters to have singulation defects (e.g., regions of the surfaces of the portion of the plurality of optical filters to be chipped, delaminated, and/or otherwise damaged), which degrades a performance and/or reliability of each optical filter of the portion of the plurality of optical filters. Often, the portion of the plurality of optical filters is a majority of the plurality of optical filters on the wafer.

Some implementations described herein provide an optical filter that includes one or more sets of layers disposed on a substrate. Each set of layers may include a first layer that comprises at least aluminum and nitrogen (e.g., an AlN material), a second layer that comprises at least silicon and oxygen (e.g., a silicon dioxide ($SiO_2$) material), and a third layer that includes at least one other material (e.g., at least one material other than an AlN material and/or an $SiO_2$ material, such as a hydrogenated silicon (Si:H) material). The second layer may be disposed between (e.g., directly between) the first layer and the third layer, thereby preventing a low durability interface between the first layer and the third layer from being formed. Moreover, a first interface between the first layer and the second layer and a second interface between the second layer and the third layer each have an improved durability as compared to a low durability interface between a layer that comprises an AlN material and a layer of another material. Accordingly, the first interface and the second interface are less likely to fail during a singulation process for singulating a plurality of optical filters on a wafer. This reduces a number of optical filters, of the plurality of optical filters, that have singulation defects and thereby reduces a number of optical filters, of the plurality of optical filters, that have a degraded performance and/or reliability. This increases a yield of optical filters, of the plurality of optical filters, that can be used for practical purposes. Further, the optical filters that do not include singulation defects have an improved durability during an operative life of the optical filters, as compared to optical filters that do not include the one or more sets of layers disclosed herein. In some implementations, each set of layers may include a fourth layer that comprises at least silicon and oxygen (e.g., an $SiO_2$ material) and that is disposed on the first layer or the fourth layer. This prevents a low durability interface from being formed between the sets of layers, further improving a durability of each optical filter.

In some implementations, the second layer and the fourth layer may each have a thickness that is less than or equal to a thickness threshold (e.g., that is less than or equal to 4 nanometers (nm), 6 nm, 8 nm, 10 nm, 15 nm, 20 nm, 30 nm, 40 nm, and/or 50 nm). In this way, the second layer and the fourth layer are each "thin" layers that have a minimal impact on a filtering performance, a transmittance performance, an angle shift performance, and/or other characteristics of an optical filter that includes the one or more sets of layers described herein.

FIG. 1 is a diagram of an overview of an example implementation 100 described herein. As shown in FIG. 1, example implementation 100 includes a sensor system 110. Sensor system 110 may be a portion of an optical system and may provide an electrical output corresponding to a sensor determination. Sensor system 110 includes an optical filter structure 120, which includes an optical filter 130, and an optical sensor 140. For example, optical filter structure 120 may include an optical filter 130 that performs a passband filtering functionality. In another example, an optical filter 130 may be aligned to an array of sensor elements of optical sensor 140.

Although some implementations described herein may be described in terms of an optical filter in a sensor system, implementations described herein may be used in another type of system, may be used external to a sensor system, or in other configurations.

As further shown in FIG. 1, and by reference number 150, an input optical signal is directed toward optical filter structure 120 at one or more angles of incidence, θ. For example, input optical signals 150-1 and 150-2 may be directed toward optical filter 120 at angles of incidence $θ_0$ (e.g., a configured angle of incidence) and θ. The input optical signal may include, but is not limited to, light associated with a particular spectral range (e.g., a spectral range centered at approximately 900 nm, such as a spectral range of 800 nm to 1000 nm; a spectral range of 500 nm to 5500 nm; or another spectral range). For example, an optical transmitter may direct the light toward optical sensor 140 to permit optical sensor 140 to perform a measurement of the light. In another example, the optical transmitter may direct another spectral range of light for another functionality, such as a testing functionality, a sensing functionality, or a communications functionality, among other examples.

As further shown in FIG. 1, and by reference number 160, a first portion of the optical signal with a first spectral range is not passed through by optical filter 130 and optical filter structure 120. For example, dielectric filter stacks of dielectric thin film layers, which may include high index material layers and low index material layers of optical filter 130, may cause the first portion of light to be reflected in a first direction and/or to be absorbed. In this case, the first portion of light may be a threshold portion of light incident on optical filter 130 not included in a bandpass of optical filter 130, such as greater than 95% of light not within a particular spectral range centered at approximately 900 nm. As shown by reference number 170, a second portion of the optical signal is passed through by optical filter 130 and optical filter structure 120. For example, optical filter 130 may pass through the second portion of light with a second spectral range in a second direction toward optical sensor 140. In this case, the second portion of light may be a threshold portion of light incident on optical filter 130 within a bandpass of optical filter 130, such as greater than 50% of incident light in a spectral range centered at approximately 900 nm. The second portion of light may pass through the optical filter 130 with less than a threshold angle shift, as described in more detail herein.

As further shown in FIG. 1, based on the second portion of the optical signal being passed to optical sensor 140, optical sensor 140 may provide an output electrical signal 180 for sensor system 110, such as for use in imaging, ambient light sensing, detecting the presence of an object, performing a measurement, or facilitating communication, among other examples. In some implementations, another arrangement of optical filter 130 and optical sensor 140 may be utilized. For example, rather than passing the second portion of the optical signal collinearly with the input optical signal, optical filter 130 may direct the second portion of the optical signal in another direction toward a differently located optical sensor 140.

As indicated above, FIG. 1 is provided as an example. Other examples may differ from what is described with regard to FIG. 1.

Figure 2A:
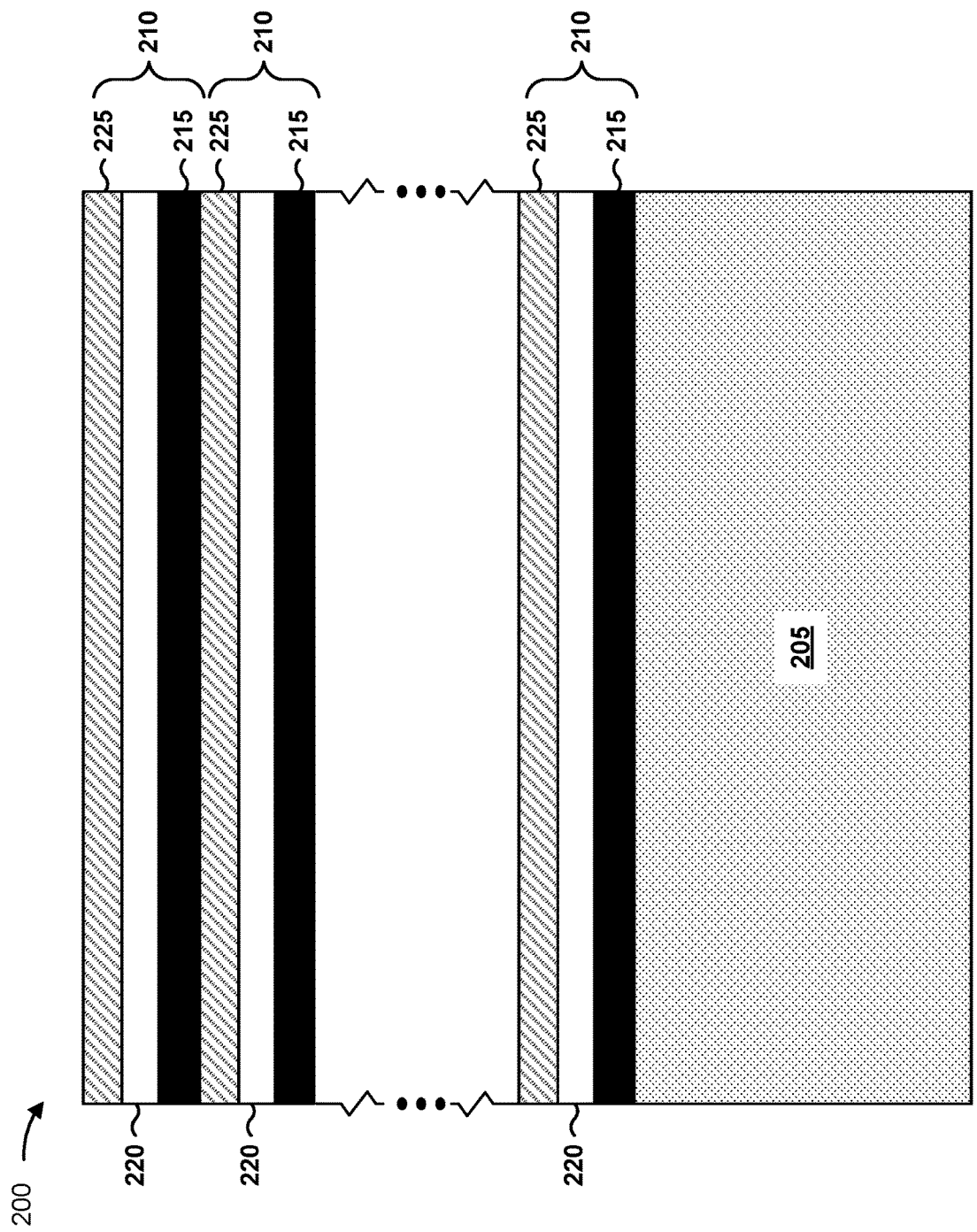
FIGS. 2A-2B are diagrams of an example optical filter.
Figure 2B:
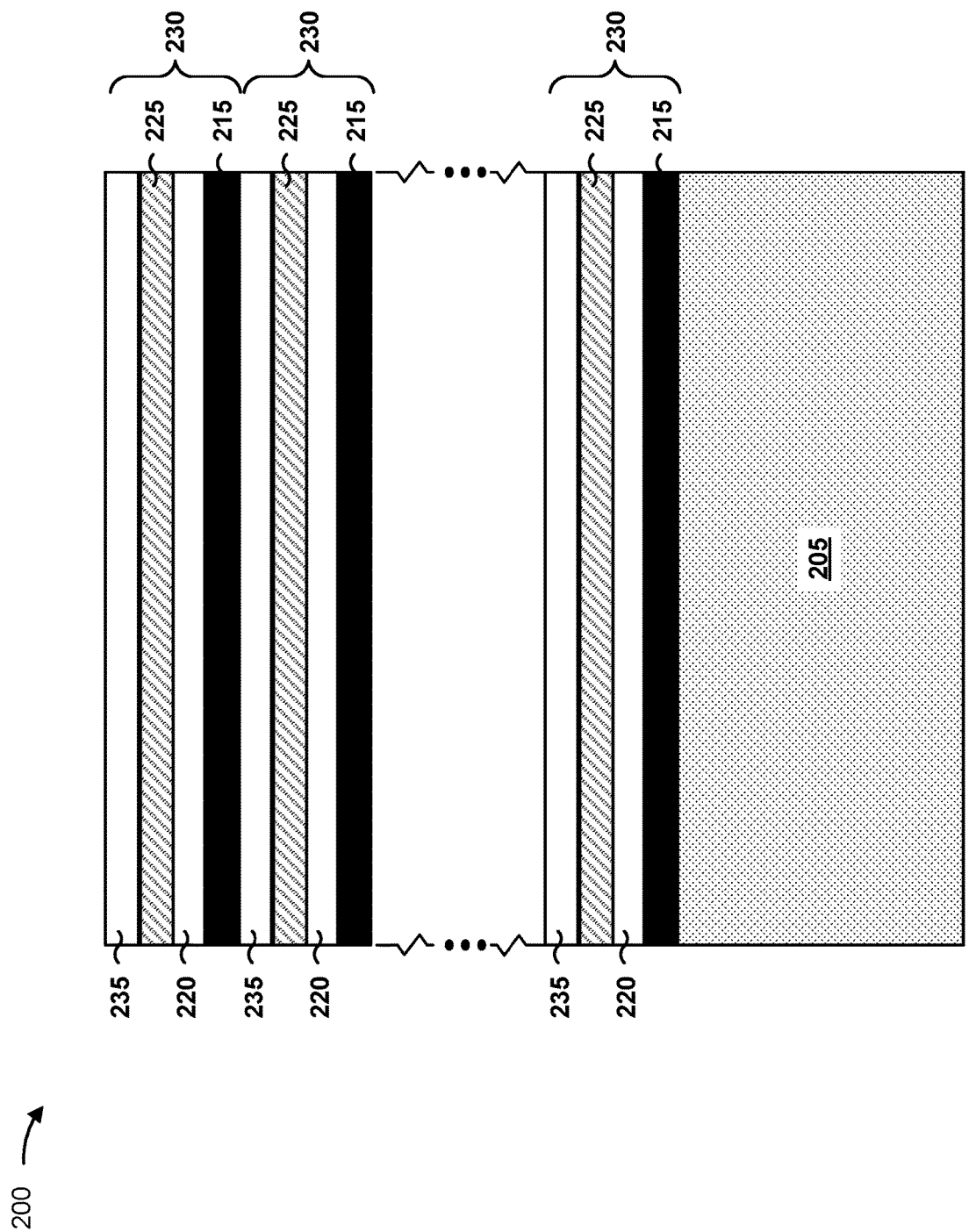

FIGS. 2A-2B are diagrams of an example optical filter 200. In some implementations, the optical filter 200 may be an optical interference filter and/or may comprise at least one of a spectral filter, a multispectral filter, a bandpass filter, a blocking filter, a long-wave pass filter, a short-wave pass filter, a dichroic filter, a linear variable filter, a circular variable filter, a Fabry-Perot filter, a Bayer filter, a plasmonic filter, a photonic crystal filter, a nanostructure or metamaterial filter, an absorbent filter, a beam splitter, a polarizing beam splitter, a notch filter, an anti-reflection filter, a reflector, or a mirror, among other examples. FIG. 2A shows an example stack up of the optical filter 200, and FIG. 2B shows another example stack up of the optical filter 200.

As shown in FIG. 2A, the optical filter 200 may include a substrate 205 and one or more sets of layers 210 (e.g., one or more sets of optical filter layers). The substrate 205 may comprise a glass substrate, a polymer substrate, a polycarbonate substrate, a metal substrate, a silicon (Si) substrate, a germanium (Ge) substrate, or an active device wafer (e.g., that comprises a photodiode (PD), a PD array, an avalanche photodiode (APD), an APD array, a charge-coupled device (CCD) sensor, and/or a complementary metal oxide semiconductor (CMOS) sensor, among other examples). In some implementations, a thickness of the substrate 205 may be greater than or equal to 20 microns (µm), 50 µm, and/or 500 µm. Additionally, or alternatively, the thickness of the substrate may be less than or equal to a particular thickness threshold. The particular thickness threshold, for example, may be less than or equal to 5 millimeters (mm).

Each set of layers 210, of the one or more sets of layers 210, may include a first layer 215, a second layer 220, and a third layer 225. The second layer 220 may be disposed between the first layer 215 and the third layer 225 (e.g., in a stack formation). In some implementations, the second layer 220 may be disposed on (e.g., directly on) the first layer 215 and the third layer 225. For example, as shown in FIG. 2A, a first surface (e.g., a bottom surface) of the second layer 220 is disposed on (e.g., directly on) a surface (e.g., a top surface) of the first layer 215, and a second surface (e.g., a top surface) of the second layer 220 is disposed on (e.g., directly on) a surface (e.g., a bottom surface) of the third layer 225. In some implementations, one or more other layers may be disposed between the first layer 215 and the second layer 220, and/or may be disposed between the second layer 220 and the third layer 225.

In some implementations, the one or more sets of layers 210 may be disposed on a single surface (e.g., the top surface) of the substrate 205 (e.g., as shown in FIG. 2A). Alternatively, when the optical filter 200 includes a plurality of sets of layers 210 (e.g., two or more sets of layers 210), at least one set of layers 210 may be disposed on a first surface (e.g., the top surface) of the substrate 205, and at least one other set of layers 210 may be disposed on a second surface (e.g., a bottom surface) of the substrate 205.

The first layer 215 may comprise a first material that includes at least aluminum and nitrogen. For example, the first material may include an aluminum nitride (AlN) material and, in some implementations, one or more other elements or materials (e.g., oxygen, hydrogen, an aluminum oxide (AlO) material, and/or an aluminum hydride (AlH) material). The third layer 225 may comprise a third material, which may include at least one other material (e.g., at least one material other than the first material). The third material may include at least one of a silicon (Si) material, a silicon and hydrogen (SiH) material, a hydrogenated silicon (Si:H) material, a hydrogenated silicon with helium (Si:H—He) material, a hydrogenated silicon with nitrogen (Si:H—N) material, an amorphous silicon (a Si) material, a silicon nitride (SiN) material, a germanium (Ge) material, a hydrogenated germanium (Ge:H) material, a silicon germanium (SiGe) material, a hydrogenated silicon germanium (SiGe:H) material, a silicon carbide (SiC) material, a hydrogenated silicon carbide (SiC:H) material, a tantalum pentoxide ($Ta_2O_5$) material, a niobium pentoxide ($Nb_2O_5$) material, a niobium titanium oxide ($NbTiO_x$) material, a niobium tantalum pentoxide ($Nb_{2-x}Ta_xO_5$) material, a titanium dioxide ($TiO_2$) material, an aluminum oxide ($Al_2O_3$) material, a zirconium oxide ($ZrO_2$) material, an yttrium oxide ($Y_2O_3$) material, or a hafnium oxide ($HfO_2$) material, among other examples. In some implementations, the third material may include at least hydrogen and silicon. For example, the third material may include an SiH material, an Si:H material, an Si:H—He material, and/or an Si:H—N material, and may, in some implementations, additionally include one or more other elements and/or materials (e.g., an Si material, an SiN material, a Ge material, a Ge:H material, an SiGe material, and/or so on). Alternatively, in some implementations, the third layer 225 may comprise the first material (e.g., that comprises at least aluminum and nitrogen) and the first layer 215 may comprise the third material (e.g., that comprises at least one other material).

In some implementations, the second layer 220 may comprise a second material that includes at least silicon and oxygen. For example, the second material may include a silicon dioxide ($SiO_2$) material and/or one or more other elements or materials (e.g., at least one of silicon; a silicon oxide ($SiO_x$) material, where x is less than 2; a silicon nitride (SiN) material; an aluminum silicon (AlSi) material; and/or another material).

In some implementations, each layer of a set of layers 210 is associated with a particular thickness. For example, each of the first layer 215, the second layer 220, and the third layer 225 may have a thickness of between 5 and 2000 nm (e.g., a thickness that is greater than or equal to 5 nm and less than or equal to 2000 nm). In some implementations, the second layer 220 (e.g., that comprises the second material that includes at least silicon and oxygen) may have a thickness between 2 nm and a thickness threshold (e.g., a thickness that is greater than or equal to 2 nm and less than or equal to the thickness threshold). The thickness threshold may be, for example, less than or equal to 4 nm, 6 nm, 8 nm, 10 nm, 15 nm, 20 nm, 30 nm, 40 nm, and/or 50 nm.

In some implementations, when the optical filter 200 includes a plurality of sets of layers 210 (e.g., two or more sets of layers 210), a layer of a first set of layers 210 may have a same or different thickness as a corresponding layer of a second set of layers 210. For example, a first layer 215, a second layer 220, and a third layer 225 of the first set of layers may have respective thicknesses that are the same as (e.g., equal to, within a threshold that may be less than or equal to 1 nm), or different than, corresponding thicknesses of a first layer 215, a second layer 220, and a third layer 225 of the second set of layers 210. Accordingly, each set of layers 210, of the plurality of sets of layers 210, may have a thickness profile that is the same as, or different than, a thickness profile of another set of layers 210 of the plurality of sets of layers 210.

Accordingly, a layer thickness of each layer in a set of layers 210 and/or a quantity of the one or more sets of layers 210 may be selected based on an intended set of optical characteristics of the optical filter 200, such as an intended passband, an intended transmissivity, and/or another optical characteristic. For example, the layer thickness of each layer in a set of layers 210 and/or the quantity of the one or more sets of layers 210 may be selected to permit optical filter 200 to be utilized for a spectral range of between 800 to 1000 nm (e.g., with a center wavelength of approximately 900 nm), a spectral range between 500 and 5500 nm, or another spectral range.

As shown in FIG. 2B, the optical filter 200 may include the substrate 205 and one or more sets of layers 230 (e.g., one or more sets of optical filter layers). Each set of layers 230, of the one or more sets of layers 230, may include the first layer 215, the second layer 220, and the third layer 225 (e.g., as described elsewhere herein), and may further include a fourth layer 235. The second layer 220 may be disposed between the first layer 215 and the third layer 225, and one particular layer, of the first layer 215 and the third layer 225, may be disposed between the second layer 220 and the fourth layer 235 (e.g., in a stack formation). In some implementations, the second layer 220 may be disposed on (e.g., directly on) the first layer 215 and the third layer 225, and the fourth layer 235 may be disposed on (e.g., directly on) the particular layer (e.g., the first layer 215 or the third layer 225). For example, as shown in FIG. 2B, a first surface (e.g., a bottom surface) of the second layer 220 is disposed on (e.g., directly on) a surface (e.g., a top surface) of the first layer 215, a second surface (e.g., a top surface) of the second layer 220 is disposed on (e.g., directly on) a first surface (e.g., a bottom surface) of the third layer 225, and a second surface (e.g., a top surface) of the third layer 225 is disposed on a surface (e.g., a bottom surface) of the fourth layer 235. In some implementations, one or more other layers may be disposed between the first layer 215 and the second layer 220, may be disposed between the second layer 220 and the third layer 225, and/or may be disposed between the particular layer (e.g., the first layer 215 or the third layer 225) and the fourth layer 235.

In some implementations, the one or more sets of layers 230 may be disposed on a single surface (e.g., the top surface) of the substrate 205 (e.g., as shown in FIG. 2B). Alternatively, when the optical filter 200 includes a plurality of sets of layers 230 (e.g., two or more sets of layers 230), at least one set of layers 230 may be disposed on a first surface (e.g., the top surface) of the substrate 205, and at least one other set of layers 230 may be disposed on a second surface (e.g., a bottom surface) of the substrate 205.

The fourth layer 235 may comprise a fourth material that includes at least silicon and oxygen, such as an $SiO_2$ material and/or one or more other elements or materials (e.g., the fourth material may be the same as, or similar to, the second material of the second layer 220). In some implementations, each layer of a set of layers 230 is associated with a particular thickness (e.g., in a similar manner as that disclosed herein with respect to each layer of the set of layers 210). For example, each of the first layer 215, the second layer 220, the third layer 225, and the fourth layer 235 may have a thickness of between 5 and 2000 nm (e.g., a thickness that is greater than or equal to 5 nm and less than or equal to 2000 nm). In some implementations, the second layer 220 and the fourth layer 235 (e.g., that each comprise at least silicon and oxygen) may each have a thickness between 2 nm and a thickness threshold (e.g., a thickness that is greater than or equal to 2 nm and less than or equal to the thickness threshold). The thickness threshold may be, for example, less than or equal to 4 nm, 6 nm, 8 nm, 10 nm, 15 nm, 20 nm, 30 nm, 40 nm, and/or 50 nm. The thickness of the second layer 220 may be the same as (e.g., equal to, within a threshold that may be less than or equal to 1 nm), or different than, the thickness of the fourth layer 235.

In some implementations, when the optical filter 200 includes a plurality of sets of layers 230 (e.g., two or more sets of layers 230), a layer of a first set of layers 230 may have a same or different thickness as a corresponding layer of a second set of layers 230. For example, a first layer 215, a second layer 220, a third layer 225, and a fourth layer 235 of the first set of layers may have respective thicknesses that are the same as (e.g., equal to, within a threshold that may be less than or equal to 1 nm), or different than, corresponding thicknesses of a first layer 215, a second layer 220, a third layer 225, and a fourth layer 235 of the second set of layers 230. Accordingly, each set of layers 230, of the plurality of sets of layers 230, may have a thickness profile that is same as or different than a thickness profile of another set of layers 230 of the plurality of sets of layers 230.

Accordingly, a layer thickness of each layer in a set of layers 230 and/or a quantity of the one or more sets of layers 230 may be selected based on an intended set of optical characteristics of the optical filter 200, such as an intended passband, an intended transmissivity, and/or another optical characteristic. For example, the layer thickness of each layer in a set of layers 230 and/or the quantity of the one or more sets of layers 230 may be selected to permit optical filter 200 to be utilized for a spectral range of between 800 to 1000 nm (e.g., with a center wavelength of approximately 900 nm), a spectral range between 500 and 5500 nm, or another spectral range.

In some implementations, the one or more sets of layers 210 and/or the one or more sets of layers 230 may be configured to pass a threshold percentage of light associated with a particular spectral range. For example, the one or more sets of layers 210 and/or the one or more sets of layers 230 may be configured to pass a threshold percentage of light associated with a spectral range of between 800 and 1000 nm (e.g., with a center wavelength of approximately 900 nm). The threshold range, for example, may be greater than or equal to 85%, 90%, 95%, and/or 99%. In some implementations, for each layer (e.g., one of the first layer 215 or the third layer 225) in the one or more sets of layers 210 and/or the one or more sets of layers 230 that comprise the first material that includes at least aluminum and nitrogen (e.g., an AlN material), a refractive index of the layer may be between 1.9 and 2.2 for light that has a wavelength that is between 500 and 5500 nm. An extinction coefficient of each layer that comprises the first material may be less than 0.001 for light that has a wavelength that is between 500 and 5500 nm. Additionally, or alternatively, for each layer (e.g., the other one of the first layer 215 or the third layer 225) in the one or more sets of layers 210 and/or the one or more sets of layers 230 that comprise the at least one other material (e.g., other than AlN and other than $SiO_2$), a refractive index of the layer may be between 3.5 and 3.9 for light that has a wavelength that is between 500 and 5500 nm.

In some implementations, a stress (e.g., a net stress) of the layers of the one or more sets of layers 210 and/or the one or more sets of layers 230 that comprise the first material that includes at least aluminum and nitrogen (e.g., an AlN material) may be between −1000 and 800 megapascals (MPa) (e.g., greater than or equal to −1000 MPa and less than or equal to 800 MPa). Additionally, or alternatively, a stress of each layer that comprises the first material may be between −1000 and 800 MPa. That is, a stress of a particular layer (e.g., a particular first layer 215 or a particular third layer 225) that comprises the first material, of the one or more sets of layers 210 and/or the one or more sets of layers 230, may be between −1000 and 800 MPa and a stress of another particular layer (e.g., another particular first layer 215 or another particular third layer 225) that comprises the first material, of the one or more sets of layers 210 and/or the one or more sets of layers 230, may be between −1000 and 800 MPa. The stress of the particular layer may be the same as, or different than, the stress of the other particular layer. For example, the stress of the particular layer may be tensile (e.g., greater than or equal to 0 MPa) and the stress of the other particular layer may be compressive (e.g., less than 0 MPa), or vice versa. In some implementations, a stress (e.g., a net stress) of the one or more sets of layers 210 and/or the one or more sets of layers 230 may be approximately zero (0) MPa (e.g., within a tolerance, wherein the tolerance is less than or equal to 5 MPa). In some implementations, a stress (e.g., a net stress) of the one or more sets of layers 210 and/or the one or more sets of layers 230 may be approximately equal to a particular amount of stress (e.g., within a tolerance, wherein the tolerance is less than or equal to 5 MPa). For example, of the one or more sets of layers 210 and/or the one or more sets of layers 230 may comprise a particular configuration of compressive materials and/or tensile materials, such that the stress of the one or more sets of layers 210 and/or the one or more sets of layers 230 is equal to a particular amount of stress, which may be less than or equal to 50 MPa, 100 MPa, 200 MPa, 350 MPa, and/or 500 MPa, among other examples.

In some implementations, the optical filter 200 may include the substrate 205, the one or more sets of layers 210, and the one or more sets of layers 230. The one or more sets of layers 210 and the one or more sets of layers 230 may be disposed on the substrate 205 (e.g., on a top surface and/or a bottom surface of the substrate 205) in a particular order, such as an alternating order. The one or more sets of layers 210 and the one or more sets of layers 230 may be disposed on the substrate 205 in the particular order to permit the one or more sets of layers 210 and the one or more sets of layers 230 to pass a threshold percentage of light associated with a particular spectral range, to have a particular stress (e.g., a particular net stress), and/or to exhibit other characteristics discussed herein.

In some implementations, one or more other layers may be included in the optical filter 200, such as one or more protective layers, one or more cap layers (e.g., to provide environmental protection to the one or more sets of layers 210 and the one or more sets of layers 230), and/or one or more layers to provide one or more other filtering functionalities (e.g., a blocker or an anti-reflection coating, among other examples). For example, in a single surface configuration, an additional layer (e.g., a cap layer), such as a dielectric layer (e.g., that comprises an oxide material, such as a silicon dioxide ($SiO_2$) material, a zirconium dioxide ($ZrO_2$) material, and/or an yttrium oxide ($Y_2O_3$) material; a nitride material, such as a silicon nitride ($Si_3N_4$) material, a titanium nitride (TiN) material, and/or a zirconium nitride (ZrN) material; and/or another material that provides environmental protection), may be disposed on a surface (e.g., a top surface) of the one or more sets of layers 210 and the one or more sets of layers 230.

Figure 3:
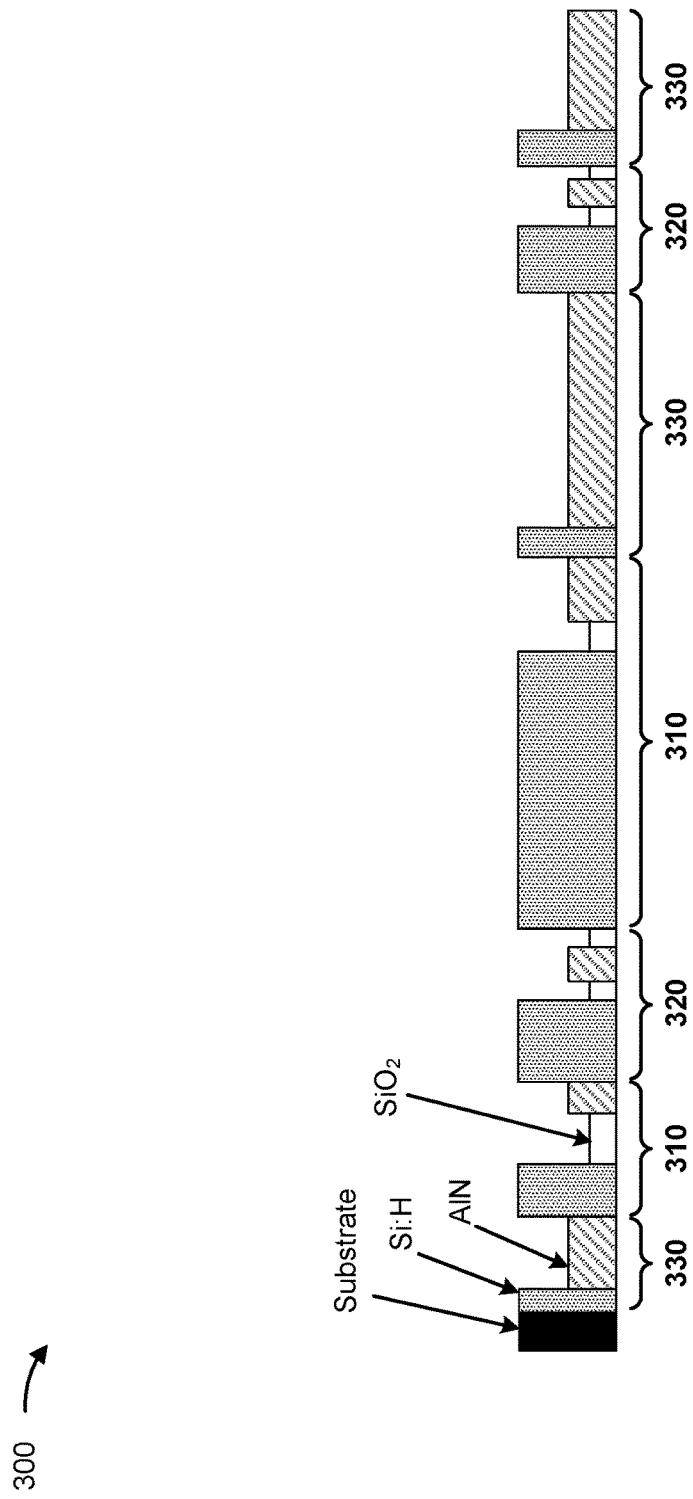
FIG. 3 is a diagram of an example configuration of the optical filter described herein.

In some implementations, the optical filter 200 may include one or more other sets of layers (e.g., one or more sets of layers 330 shown in FIG. 3). Each of the one or more other sets of layers may include a layer that comprises at least aluminum and nitrogen (e.g., an AlN material) and another layer that comprises at least one other material (e.g., that are similar to the first layer 215 and the third layer 225), and may not include a layer that comprises an $SiO_2$ material (e.g., may not include a second layer 220). For example, a surface of the layer may be disposed on (e.g., directly on) a surface of the other layer. In some implementations, a set of layers, of the one or more other sets of layers, may be disposed on a particular set of layers, of the one or more sets of layers 210 and the one or more sets of layers 230, or may be disposed on the substrate 205, and the one or more sets of layers 210 and the one or more sets of layers 230 may be disposed on the set of layers.

As indicated above, FIGS. 2A-2B are provided as an example. Other examples may differ from what is described with regard to FIGS. 2A-2B.

FIG. 3 is a diagram 300 of an example configuration of the optical filter 200 described herein. The optical filter 200 may include one or more sets of layers 310 (e.g., that are the same as, or similar to, the one or more sets of layers 210 described herein in relation to FIGS. 2A-2B), one or more sets of layers 320 (e.g., that are the same as, or similar to, the one or more sets of layers 230 described herein in relation to FIGS. 2A-2B), and/or one or more sets of layers 330 (e.g., that are the same as, or similar to, the one or more other sets of layers described herein in relation to FIGS. 2A-2B) disposed on a substrate (e.g., that is the same as, or similar to, the substrate 205 described herein in relation to FIGS. 2A-2B). As shown in FIG. 3, a set of layers 310 includes a first layer that comprises an Si:H material, a second layer that comprises an $SiO_2$ material, and a third layer that comprises an AlN material, wherein the second layer is disposed between the first layer and the second layer. A set of layers 320 includes a first layer that comprises an Si:H material, a second layer that comprises an $SiO_2$ material, a third layer that comprises an AlN material, and a fourth layer that comprises an $SiO_2$ material, wherein the second layer is disposed between the first layer and the second layer and the third layer is disposed between the second layer and the fourth layer. A set of layers 330 includes a first layer that comprises an Si:H material and a second layer that comprises an AlN material, and does not include a layer that comprises an $SiO_2$ material. As further shown in FIG. 3, the one or more sets of layers 310, the one or more sets of layers 320, and/or the one or more sets of layers 330 may be disposed on the substrate in a particular order (e.g., to permit the optical filter 200 to pass a threshold percentage of light associated with a particular spectral range, to have a particular stress (e.g., a particular net stress), and/or to exhibit other characteristics discussed elsewhere herein).

As indicated above, FIG. 3 is provided as an example. Other examples may differ from what is described with regard to FIG. 3.

Figure 4:
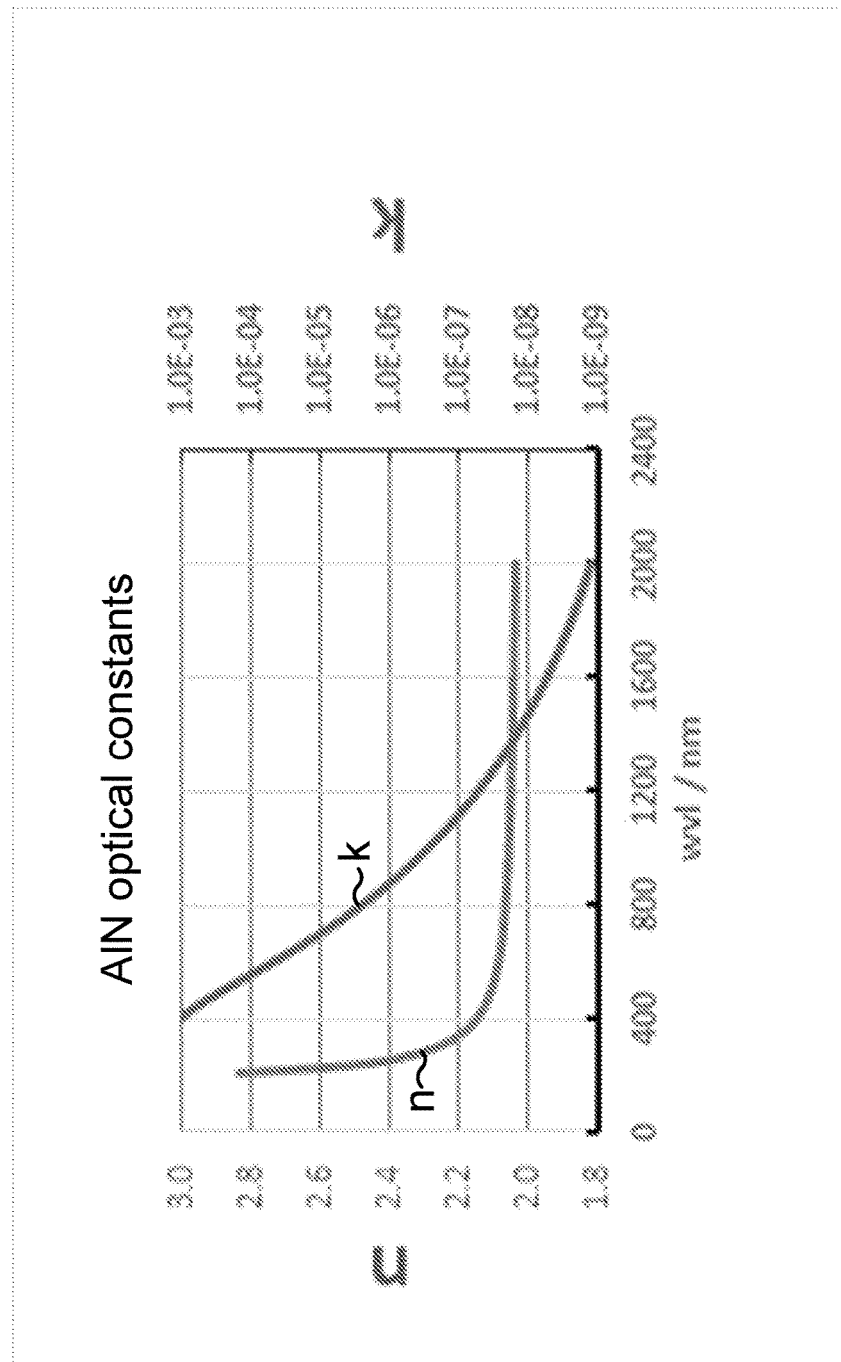
FIG. 4 is a diagram of an example plot of an extinction coefficient and a refractive index of one or more layers that comprise an AlN material described herein.

FIG. 4 is a diagram of an example plot 400 of an extinction coefficient (k) and a refractive index (n) of one or more layers that comprise at least aluminum and nitrogen (e.g., an AlN material) described herein. As shown in FIG. 4, the extinction coefficient may be less than 0.001 for light that has a wavelength that is between 500 and 2000 nm. As further shown in FIG. 4, the refractive index may be less than 2.2 for light that has a wavelength that is between 500 and 2000 nm.

As indicated above, FIG. 4 is provided as an example. Other examples may differ from what is described with regard to FIG. 4.

Figure 5:
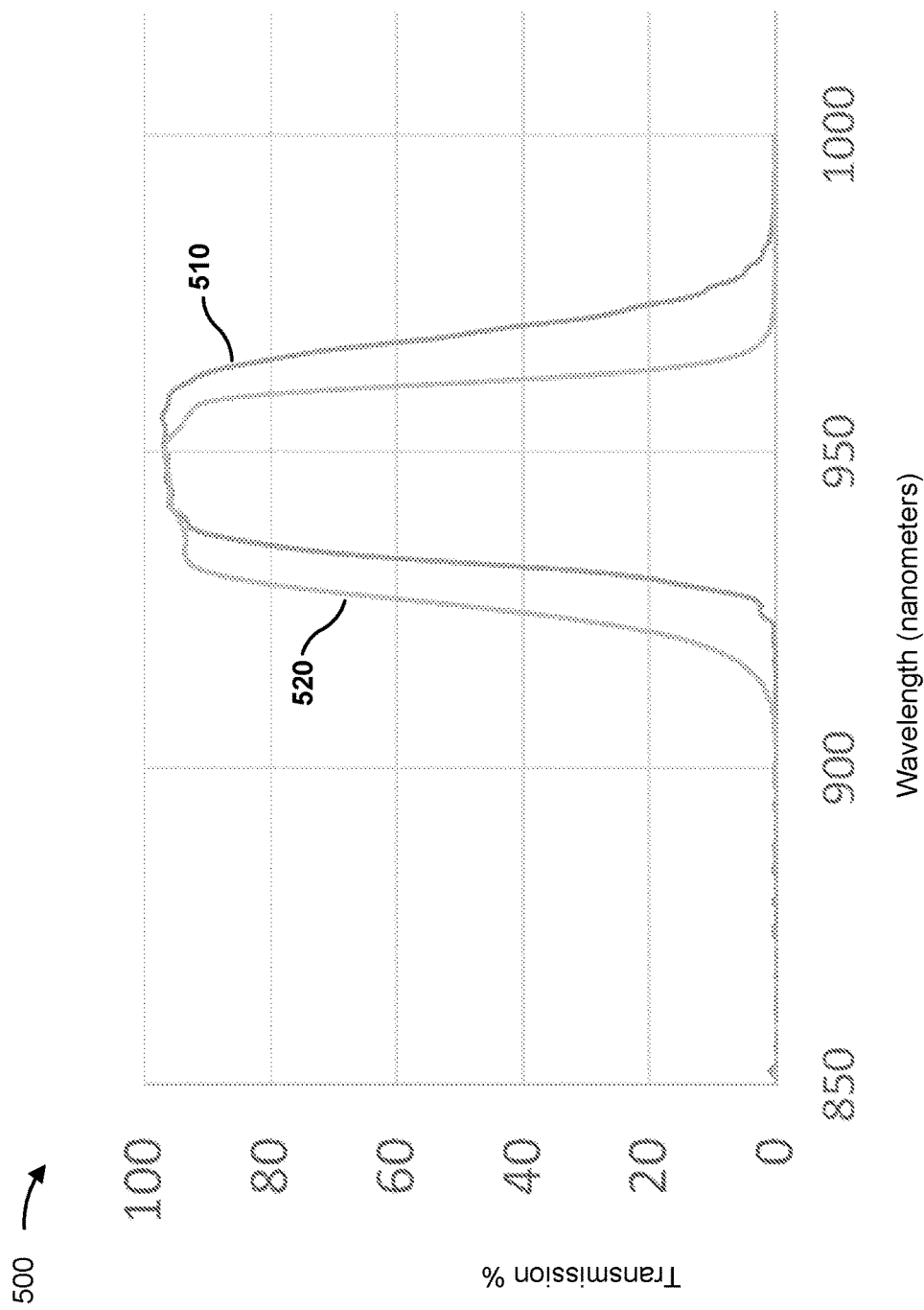
FIG. 5 is a diagram of an example plot that shows a transmittance performance and angle shift performance of the optical filter described herein.

FIG. 5 is a diagram of an example plot 500 that shows a transmittance performance and angle shift performance of the optical filter 200 described herein. As shown in FIG. 5, and by reference number 510, the optical filter 200 may transmit greater than approximately 85% (with a peak of approximately 97%) of light that has a wavelength that is between 935 and 960 nm, when the light has an angle of incidence of 0 degrees. As further shown in FIG. 5, and by reference number 520, the optical filter 200 may transmit greater than approximately 85% (with a peak of approximately 96%) of light that has a wavelength that is between 928 and 954 nm, when the light has an angle of incidence of 30 degrees. In some implementations, an angle shift at a center wavelength of the optical filter 200 may be less than 1.0% of the center wavelength for angles of incidence between 0 degrees and 30 degrees. For example, when the optical filter is configured for a center wavelength at 940 nanometers (nm), the optical filter may have an angle shift of, for example, less than 9.4 nm at angles of incidence of up to 30 degrees.

In some implementations, the optical filter may achieve a transmittance, at the center wavelength, of greater than a transmittance threshold, such as greater than 80%, greater than 85%, greater than 90%, and/or greater than 95% (e.g., of a peak transmissivity of the optical filter at angles of incidence between 0 to 30 degrees). Moreover, the optical filter may achieve a ripple of less than +/−10%, less than +/−5%, or less than +/−1%, where the ripple represents a deviation in transmittance across the passband at angles of incidence between 0 and 30 degrees.

As indicated above, FIG. 5 is provided as an example. Other examples may differ from what is described with regard to FIG. 5.

Figure 6:
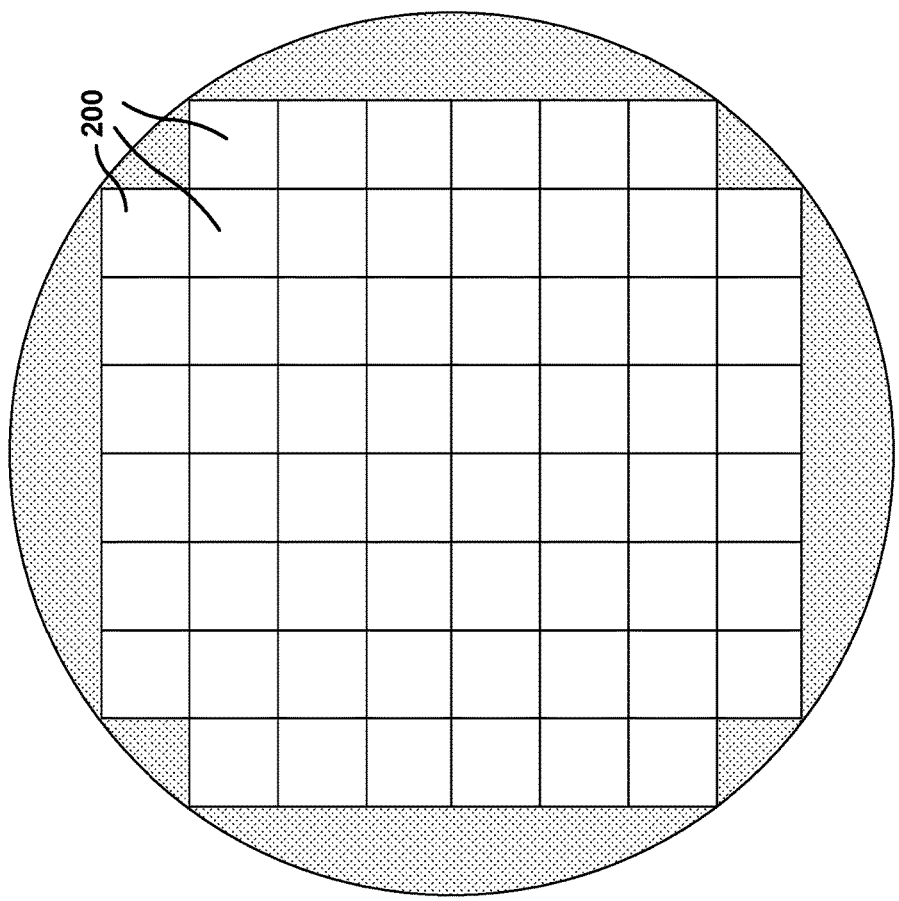
FIG. 6 is a diagram of an overview of an example wafer.

FIG. 6 is a diagram of an overview of an example wafer 600. As shown in FIG. 6, the wafer may include a plurality of optical filters 200. The plurality of optical filters 200 may be formed on the wafer 600 using a sputtering process, such as a magnetron sputtering process, a singulation process (such as a dicing process), and/or another process. In some implementations, a threshold percentage of the plurality of optical filters 200 do not include singulation defects. The threshold percentage may be, for example, greater than or equal to 50%, 65%, 75%, 85%, 95%, and/or 99%.

An optical filter 200 may include a singulation defect when a region on a surface (e.g., a top surface) of the optical filter 200 is chipped, delaminated, and/or otherwise damaged (e.g., as a result of the sputtering process and/or the singulation process), and the region is greater than or equal to a threshold size. The threshold size may be, for example, greater than or equal to 0.001%, 0.00125%, 0.0025%, 0.0050%, 0.01%, 0.05%, 0.1%, 0.5%, and/or an area of the surface of the optical filter 200. In some implementations, the threshold size may be greater than or equal to 10 square microns ($\mu m^2$), 20 $\mu m^2$, 30 $\mu m^2$, 40 $\mu m^2$, and/or 50 $\mu m^2$, among other examples. Accordingly, the threshold percentage of the plurality of optical filters 200 may not include damaged regions that are greater than or equal to the threshold size.

The wafer 600 may include the threshold percentage of the plurality of optical filters 200 that do not include singulation defects due to an improved durability of the plurality of optical filters 200, which is because of inclusion, in each of the plurality of optical filters 200, of the one or more sets of layers 210 and/or the one or more sets of layers 230 described herein.

As indicated above, FIG. 6 is provided as an example. Other examples may differ from what is described with regard to FIG. 6.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

As used herein, the term "X material," where X is a chemical composition, such as AlN, $SiO_2$, or Si:H, indicates that at least a threshold percentage of X is included in the X material. The threshold percentage may be, for example, greater than or equal to 1%, 5%, 10%, 25%, 50%, 75%, 85%, 90%, 95%, and/or 99%. Also, when a material is referred to by a specific chemical name or formula, the material may include non-stoichiometric variations of the stoichiometrically exact formula identified by the chemical name. For example, the aluminum nitride (AlN) material described herein may include $AlN_x$, where x is between 0.8 and 1.2.

What is claimed is:

1. An optical interference filter, comprising:
a substrate; and
a plurality of sets of layers that are disposed on the substrate, wherein each set of layers includes:
a first layer that comprises aluminum nitride;
a second layer that comprises at least silicon and oxygen; and
a third layer that comprises at least hydrogen and silicon, wherein:
the third layer does not comprise aluminum nitride,
the second layer is disposed between the first layer and the third layer, and
the first layer, of a first set of layers of the plurality of sets of layers, is disposed directly on a surface of the substrate.

2. The optical interference filter of claim 1, wherein a thickness of the second layer is between 2 nanometers and 10 nanometers.

3. The optical interference filter of claim 1, wherein a first surface of the second layer is disposed on a surface of the first layer, and
wherein a second surface of the second layer is disposed on a surface of the third layer.

4. The optical interference filter of claim 1, wherein each set of layers further includes a fourth layer that comprises an $SiO_2$ material, and
wherein one of the first layer or the third layer is disposed between the second layer and the fourth layer.

5. The optical interference filter of claim 1, wherein a thickness of the substrate is greater than or equal to 50 microns.

6. The optical interference filter of claim 1, wherein the plurality of sets of layers is configured to pass a threshold percentage of light associated with a spectral range of between 800 and 1000 nanometers,
wherein the threshold percentage of light is greater than or equal to 85%.

7. The optical interference filter of claim 1, wherein a net stress of the plurality of sets of layers is approximately equal to a particular amount of stress.

8. The optical interference filter of claim 1, wherein:
the second layer comprises a silicon dioxide ($SiO_2$) material; and
the third layer comprises a hydrogenated silicon (Si:H) material.

9. The optical interference filter of claim 1, wherein at least one set of layers, of the plurality of sets of layers, is disposed on the surface of the substrate, and
at least one other set of layers, of the plurality of sets of layers, is disposed on another surface of the substrate.

10. An optical interference filter, comprising:
a substrate; and
one or more sets of layers, wherein a first set of layers includes:
a first layer, that comprises aluminum nitride, disposed directly on a surface of the substrate;

a second layer that comprises at least silicon and oxygen; and a third layer that comprises at least hydrogen and silicon, wherein:

the third layer does not comprise aluminum nitride, and the second layer is disposed between the first layer and the third layer.

11. The optical interference filter of claim 10, wherein a thickness of the second layer is between 2 nanometers and 40 nanometers.

12. The optical interference filter of claim 10, wherein a first surface of the second layer is disposed on a surface of the first layer, and wherein a second surface of the second layer is disposed on a surface of the third layer.

13. The optical interference filter of claim 10, wherein the first set of layers further includes a fourth layer that comprises at least silicon and oxygen, and wherein:

one particular layer of the first layer or the third layer is disposed between the second layer and the fourth layer;

a first surface of the particular layer is disposed on a surface of the second layer; and a second surface of the particular layer is disposed on a surface of the fourth layer.

14. The optical interference filter of claim 10, further comprising a second set of layers disposed on the first set of layers, wherein the second set of layers includes:

a fourth layer that comprises at least hydrogen and silicon; and a fifth layer that comprises at least aluminum and nitrogen, wherein the other set of layers does not include a layer that comprises at least silicon and oxygen.

15. The optical interference filter of claim 14, wherein a surface of the fourth layer is disposed on a surface of the fifth layer.

16. A wafer, comprising:

a plurality of optical interference filters, wherein each optical interference filter includes:

a substrate; and a plurality of sets of layers that are disposed on the substrate, wherein each set of layers includes:

a first layer that comprises aluminum nitride;

a second layer that comprises at least silicon and oxygen; and a third layer that comprises at least hydrogen and silicon, wherein:

the second layer is disposed between the first layer and the third layer, and the first layer, of a first set of layers of the plurality of sets of layers, is disposed directly on a surface of the substrate.

17. The wafer of claim 16, wherein a thickness of the second layer is between 2 nanometers and 40 nanometers.

18. The wafer of claim 16, wherein a first surface of the second layer is disposed on a surface of the first layer, and wherein a second surface of the second layer is disposed on a surface of the third layer.

19. The wafer of claim 16, wherein each set of layers further includes a fourth layer that comprises at least silicon and oxygen, and wherein:

one particular layer of the first layer or the third layer is disposed between the second layer and the fourth layer;

a first surface of the particular layer is disposed on a surface of the second layer; and a second surface of the particular layer is disposed on a surface of the fourth layer.

20. The wafer of claim 16, wherein the plurality of optical interference filters are formed using a singulation process, wherein greater than or equal to 95% of the plurality of optical interference filters do not include singulation defects.

* * * * *